US011179982B2

(12) United States Patent
Webster et al.

(10) Patent No.: US 11,179,982 B2
(45) Date of Patent: Nov. 23, 2021

(54) AUTOMATIC CAR TRAILER HITCHING AND UNHITCHING SYSTEM (71) Applicants: Gary Webster, Aberdeenshire (GB); Neil Keron, Victoria (AU)

(72) Inventors: Gary Webster, Aberdeenshire (GB); Neil Keron, Victoria (AU)

(*) Notice: Subject to any disclaimer, the term of this patent is extended or adjusted under 35 U.S.C. 154(b) by 270 days.

(21) Appl. No.: 16/329,799

(22) PCT Filed: Sep. 19, 2017

(86) PCT No.: PCT/GB2017/000142
§ 371 (c)(1),
(2) Date: Mar. 1, 2019

(87) PCT Pub. No.: WO2018/055321
PCT Pub. Date: Mar. 29, 2018

(65) Prior Publication Data
US 2019/0241032 A1 Aug. 8, 2019

(30) Foreign Application Priority Data

Sep. 24, 2016 (GB) .................................. 1616253
Jul. 31, 2017 (GB) .................................. 1712247

(51) Int. Cl.
B60D 1/36 (2006.01)
B60D 1/06 (2006.01)
(Continued)

(52) U.S. Cl.
CPC .................. B60D 1/36 (2013.01); B60D 1/06 (2013.01); B60D 1/465 (2013.01); B60D 1/665 (2013.01)

(58) Field of Classification Search
CPC .................................. B60S 9/215; B60D 1/36
See application file for complete search history.

(56) References Cited

U.S. PATENT DOCUMENTS 9,834,049 B2 * 12/2017 Strand ...................... B60D 1/36
10,556,473 B2 * 2/2020 Strand ...................... B60D 1/44
(Continued)

FOREIGN PATENT DOCUMENTS

CN 104400334 A 3/2015
DE 102006040879 A1 3/2008
(Continued)

OTHER PUBLICATIONS

EPO, International Search Report in PCT/GB2017/000142, dated Apr. 24, 2018 (dated Apr. 24, 2018).
(Continued)

Primary Examiner — Kevin Hurley
(74) Attorney, Agent, or Firm — Keusey & Associates, P.C.

(57) ABSTRACT

An automated system is provided for aligning a vehicle tow ball with a tow cup of a trailer. The vehicle has a controller connected to at least some of the vehicle steering, transmission and braking systems to enable the controller automatically to steer and/or move and/or brake the vehicle. Sensors at the rear of the vehicle detect the presence of an object within a region behind the vehicle. The sensors are connected to the controller to utilize the data from the sensors to identify the tow cup of a trailer located within the region behind the vehicle, and to control the reversing of the vehicle in order to bring the tow ball into alignment beneath the identified tow cup so as to facilitate coupling of the tow cup onto the tow ball.

10 Claims, 9 Drawing Sheets (51) Int. Cl.
*B60D 1/46* (2006.01)
*B60D 1/66* (2006.01)

(56) References Cited

U.S. PATENT DOCUMENTS

| | | |
|---|---|---|
| 10,953,711 B2* | 3/2021 | Ling .................. B60R 1/003 |
| 2006/0293800 A1 | 12/2006 | Werke |
| 2010/0013188 A1 | 1/2010 | Ortmann |
| 2010/0096203 A1 | 4/2010 | Freese V et al. |
| 2011/0001614 A1 | 1/2011 | Ghneim |
| 2013/0226390 A1 | 8/2013 | Luo et al. |
| 2015/0077557 A1 | 3/2015 | Han et al. |
| 2015/0321666 A1 | 11/2015 | Talty et al. |
| 2016/0272024 A1 | 9/2016 | Bochenek et al. |
| 2019/0258244 A1* | 8/2019 | Kaiser .................. B60S 9/215 |
| 2020/0130582 A1* | 4/2020 | Wong .................. B62D 15/0285 |

FOREIGN PATENT DOCUMENTS

| | | |
|---|---|---|
| EP | 2682329 A1 | 8/2014 |
| FR | 2969062 A1 | 6/2012 |
| WO | 2015005795 A2 | 1/2015 |
| WO | 2015074016 A1 | 5/2015 |
| WO | 2018065988 A1 | 4/2018 |

OTHER PUBLICATIONS

GB Intellectual Property Office, Search Report in GB 1712247.4, dated Sep. 26, 2017 (dated Sep. 26, 2017).

* cited by examiner

AUTOMATIC CAR TRAILER HITCHING AND UNHITCHING SYSTEM

BACKGROUND OF THE INVENTION

1. Field of the Invention

The invention relates to automatic hitching of a car trailer to a car and unhitching of same in a fully automatic way without the car driver needing to leave the car and with autonomous reversing of the car to the trailer without steering by the driver.

2. The Prior Art

Figure 1:
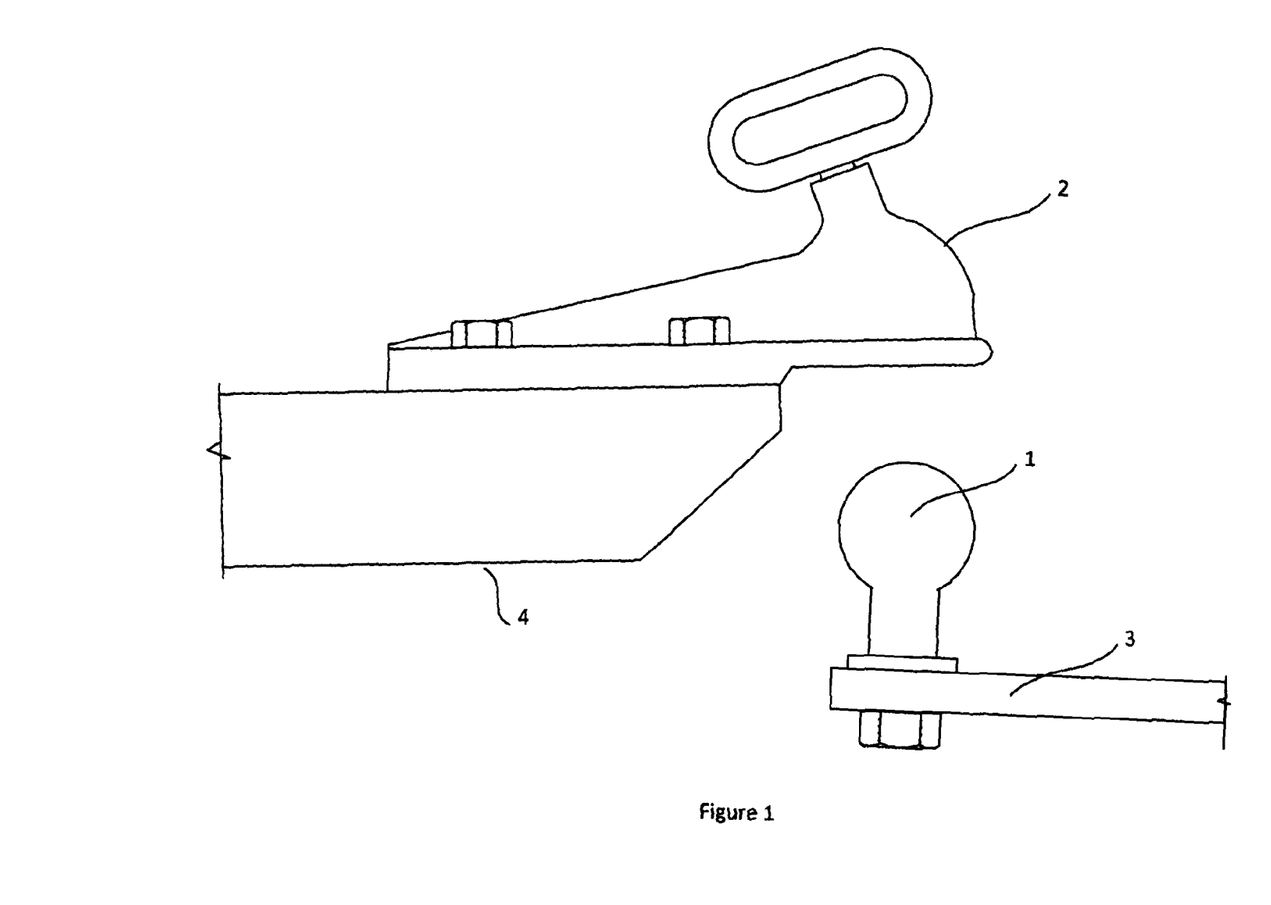
FIG. 1 is a side elevation view of a typical car tow ball and trailer tow cup.

Cars and other personal vehicles such as SUVs (Sports Utility Vehicles) are sometimes used to tow trailers such as horse floats, boat trailers, caravans and general purpose trailers etc. The connection between car and trailer is commonly made using a steel ball mounted on the rear of the car and a mating inverted cup mounted on the trailer (FIG. 1). The connection also includes a secondary safety mechanism such as a chain or cable to constrain the trailer in the event of failure of the ball and cup connection. Commonly, an electrical socket is provided on the car for connection of electrical plug on the trailer for powering the trailer lights and other functions if required. Commonly, when the trailer is not hitched to a vehicle, the front of the trailer is supported by a jockey wheel and jack. The jacking arrangement allows the trailer tow cup to be lowered over the car tow ball once the cup and ball are aligned.

There are several problems associated with current practice. Firstly, the trailer tow cup is not visible to the driver while he/she is reversing the car to the trailer. Even with an assistant, this operation can prove challenging to all but the most experienced trailer owners. Secondly, lowering of the trailer by winding down the jockey wheel and the reverse operation of unhitching can be physically challenging. Thirdly, once the weight of the trailer is transferred from the jockey wheel to the car tow ball, the jockey wheel and jack assembly is stowed by undoing a clamp, manually raising the whole jockey wheel and jack assembly and re-tightening the clamp. This frequently rattles loose during the journey resulting in damage to the jockey wheel and jack assembly.

Numerous inventions have been made for easing the reversing of a car to a trailer. These all rely on some additional devices fitted to the trailer and, hence, they are only beneficial for use with trailers that have previously been fitted with the devices. Numerous inventions have been made for autonomous self-parking and self-garaging of cars and even for self-driving cars. There are no know detection systems currently suitable for autonomously reversing a car with sufficient accuracy to bring the car tow ball exactly under the trailer tow cup to allow automatic connection of the cup and ball. There are no known systems suitable for automatically connecting the tow cup and ball, for automatically connecting the secondary safety connector, for automatically connecting the car to trailer electrical connection, automatically raising the jockey wheel to travelling height and for automatically releasing the trailer brakes or for automatically reversing these operations.

SUMMARY OF THE INVENTION

According to a first aspect of the present invention there is provided an automated system for aligning a vehicle tow ball with a tow cup of a trailer, comprising a vehicle having a controller connected to the vehicle steering and braking systems to enable the controller automatically to steer and/or brake the vehicle, a tow ball mounted on a rear of the vehicle, a plurality of sensors associated with the rear of the vehicle for detecting the presence of an object within a region behind the vehicle, and at least one camera associated with the rear of the vehicle, wherein the sensors and the at least one camera are connected to the controller, the controller being configured to utilise the data from the sensors and the at least one camera, in conjunction with pattern recognition systems, to identify, in use, the tow cup of a trailer located within said region behind the vehicle, and to control the reversing of the vehicle in order to bring the tow ball into alignment beneath the identified tow cup so as to facilitate coupling of the tow cup onto the tow ball.

The system of the present invention has the advantage that the combination of the sensors and the pattern recognition systems enables recognition and locating of any tow cup on any existing trailer, so as to enable accurate autonomous reversing of the vehicle to bring the tow ball of the vehicle into exact alignment under the trailer tow cup without any steering intervention from the driver.

Preferably, the vehicle controller is connected to at least the steering and braking systems of the vehicle to enable the vehicle controller to control the steering and braking of the vehicle without driver intervention. In a particularly preferred embodiment, vehicle has an automatic or clutchless gear system and the vehicle controller is also connected to the drive system to allow autonomous movement of the vehicle without driver intervention.

The sensors may be dedicated sensors or may be proximity sensors which are also used as parking sensors. The sensors may be ultrasonic sensors, but in a preferred embodiment at least some of the sensors are microwave (radar) transceivers which use reflected signals for detection of the trailer tow cup.

In one embodiment, at least one sensor is associated with the tow ball, which may be a single sensor which is aligned with the tow ball, or at least one pair of sensors which are positioned symmetrically on opposite sides of the tow ball. In either case, the tow ball sensors preferably have a shorter range and/or a higher resolution than the remainder of the sensors and are configured to monitor and control the final locating of the tow ball over the tow cup as the vehicle undergoes its final approach to the tow cup. This has the advantage of enabling more accurate locating of the tow cup during the final manoeuvring whilst still allowing initial locating of the trailer at a greater distance.

In one embodiment, at least some of the sensors may work in conjunction with a beacon which is mounted on the tow cup, either removably or permanently mounted thereon, so as to facilitate identification and location of the trailer and more particularly the tow cup. The sensors may then be configured to detect a signal transmitted by the beacon and to triangulate the location of the beacon and hence the tow cup. Indeed, in some embodiments the presence of the beacon may replace the need for a pattern recognition system since the beacon will accurately identify the location of the tow cup.

The at least one camera may be a general reversing camera or may be a camera dedicated to the trailer alignment system. In one embodiment, the camera is located proximate the tow ball and configured with a field of view which is close to the tow ball. The sensors are then used to locate the trailer and move the vehicle towards it so as to bring the trailer into the viewing range of the at least one camera, at which time the pattern recognition system is used to identify and locate the tow cup.

In a particularly preferred embodiment, a plurality of cameras are provided, at least one of which is located adjacent the tow ball for monitoring the final locating of the tow ball under the tow cup, and at least two of which are located in spaced apart relation on either side of the tow ball and are utilised to identify and locate the tow cup at a longer range than the at least one camera located adjacent the tow ball. The use of at least four cameras allows stereophotogrammetric calculation of 5 independent distances between the rear of the car and the tow cup thereby allowing the relative transverse (X) and longitudinal (Y) distances and the angle theta between the car and the trailer to be calculated by solution of simultaneous equations.

In another development of the invention, the relative height of the tow cup and tow ball are monitored and final manoeuvring suspended until the system confirms that the tow cup is high enough to allow the tow ball to be positioned thereunder.

In another development of the invention, 4 independent cameras may be mounted on the rear of the car and via a control module location inside the boot of the car give verbal instructions to the driver via an app on the driver's mobile phone to allow the driver to accurately reverse the car to align tow ball and tow cup.

In another development of the invention, three ultrasonic transceivers may be mounted permanently on the rear of the car to be used in conjunction with a single ultrasonic transceiver fixed by magnet or similar fixing arrangement. Powered by a control module in the car boot, the 3 car transceivers will each transmit coded signals to the trailer-mounted transceiver which will respond with signals to each of the car-mounted transceivers. By recording the time of flight between transmission and receipt of signal, each of the 3 car-mounted transceivers will be able to calculate the distance between itself and the tow cup. From these three distances, the control module will be able to calculate the three unknowns of relative position between car and trailer. The output from this calculation will be transmitted either to the car computer for auto-reversing in the car integrated embodiment or to the driver's mobile phone for verbal reversing instructions in the non-integrated embodiment. According to a further aspect of the present invention there is provided automated system for hitching the tow cup of a trailer to a tow ball, comprising a trailer having a tow cup with a tow ball cavity formed therein, a locking jaw associated with the tow ball cavity and moveable between a release position in which it is substantially withdrawn from the tow ball cavity so as to allow, in use, a tow ball to be inserted into or withdraw from the cavity, and a locked position in which it is extended into or under the cavity so as, in use, to lock a tow ball in the cavity, drive means operable to move the locking jaw between the locked and release positions, a jockey wheel located proximate the tow cup and vertically moveable to raise and lower the tow cup relative to the ground, drive means connected to the jockey wheel for vertically moving the jockey wheel, a controller connected to the jockey wheel drive means and the locking jaw driving means for controlling the movement of each of the jockey wheel and the locking jaw, a power supply for supplying power to the controller and each of the drive means, and communication means for receiving instructions regarding movement of the jockey wheel and the locking jaw.

The drive means for the jockey wheel is preferably a motor which winds a leg on which the jockey wheel is carried up and down. Alternatively, however, it could be a motorised drive nut or the like. Similarly, the first drive means for the locking jaw may be a motorised drive nut, servo motor, solenoid or the like. Preferably each of the jockey wheel and the locking jaw includes a fail safe device, which, in a particularly preferred embodiment, locks the jockey wheel/locking jaw in its current position in the event of failure of the associated drive means due to, for example, power failure or mechanical breakdown. The locking jaw may in particular include biasing means which biases it into its locked position.

In a particularly preferred embodiment, a tether cable is provided on the trailer having a loop which is located below the tow cup such that the loop will automatically locate over a tow ball which is being inserted into the tow cup. The tether is preferably sufficiently rigid to maintain its position under the tow cup. The tether may advantageously be retractable, for example by means of a motor, to enable it, in use, to be tightened around the neck of a tow ball to which the tow cup has been engaged. The tether cable may further advantageously be connected to the power supply means of the trailer and be configured to make an electrical connection with a part of the tow ball around which, in use, it is tightened so as to act as part of a system to supply power to the trailer from the vehicle to which it is attached, in particular the negative feed.

In a further development, the positive circuit of the power supply is connected to at least part of the internal cavity of the tow cup such that, upon the tow cup being engaged over a tow ball, an electrical connection is made between the tow ball and the positive part of the power supply of the trailer. In this way, connection of the trailer to the vehicle can automatically create a power supply to the trailer by simply having a 12V feed to the tow ball and a negative or earth feed to the portion of the tow ball around which the tether tightens.

IN a further development, signals for the lights on the trailer may be encoded in the 12V supply and delivered to a decoder which then operates to control the necessary lights on the trailer. Alternatively, a wireless communication system between the vehicle and trailer may be used to transmit such signals, and the connection between the tow ball and tow cup used just to provide a 12V power supply.

The trailer may advantageously have a rechargeable battery which is recharged from the car when the trailer is connected thereto.

The trailer furthermore preferably includes braking release means connected to the control so as to enable automated release of the trailer brake once the hitching process has been completed.

According to a further aspect of the invention, the automated tow ball aligning system of the invention is used in conjunction with the automated system for hitching the tow cup of a trailer to a tow ball of the second aspect of the invention.

The combined system then forms an automated trailer hitching system so as to allow automated reversing of the vehicle to the trailer and then automated attachment of the trailer to the car by automatically lowering of the trailer tow cup over the tow ball, automatic tightening of the tow cup on the tow ball, automatic connection of a safety cable from the trailer to the car, automatic electrical connection of the car to the trailer, automatic raising and stowing of the jockey wheel, automatic releasing of the trailer parking brakes, autonomous checking to ensure the connections are correctly made and autonomous informing of the driver that the trailer is ready to be towed away. The system also allows autonomous and automatic reversal of the hitching process. For trailers to which the additional hardware has been fitted, both hitching and unhitching processes are completed without the driver leaving the car driving seat. For other trailers without additional hardware, the system only provides autonomous reversing of the car to position the car tow ball accurately under the trailer tow cup at which point the trailer hitching must be carried out in the normal manual manner.

The autonomous reversing system will begin operation once the car driver has brought the rear of the car to within a few metres 23 of the stationary trailer tow cup. The driver will then inform the car either by voice activation, console switch or the like that he/she wishes the car to take over the trailer hitching operation.

A characteristic of all trailer tow cups which the present invention could use in the target recognition process is that they all have two identical but mirror imaged curved surfaces. These will create characteristic reflections and interference patterns that can be recognised by suitable intelligent software in the car computer. It will be apparent to a person skilled in the relevant art that various changes in form and detail can be made to the detection system herein described without departing from the spirit and scope of the invention. Thus, the present invention should not be limited by any of the above described exemplary embodiment. Given the current status of available hardware, development of the details of a system for generic tow cup recognition is considered achievable.

The relative height above ground of the tow cup and tow ball will also be detected to advise the driver if the tow cup is not high enough for the tow ball to pass under it.

When the autonomous reversing system has positioned the car tow ball accurately under the trailer tow cup, the automatic hitching system can commence for those trailers which have been fitted with the additional hardware described below.

Figure 7:
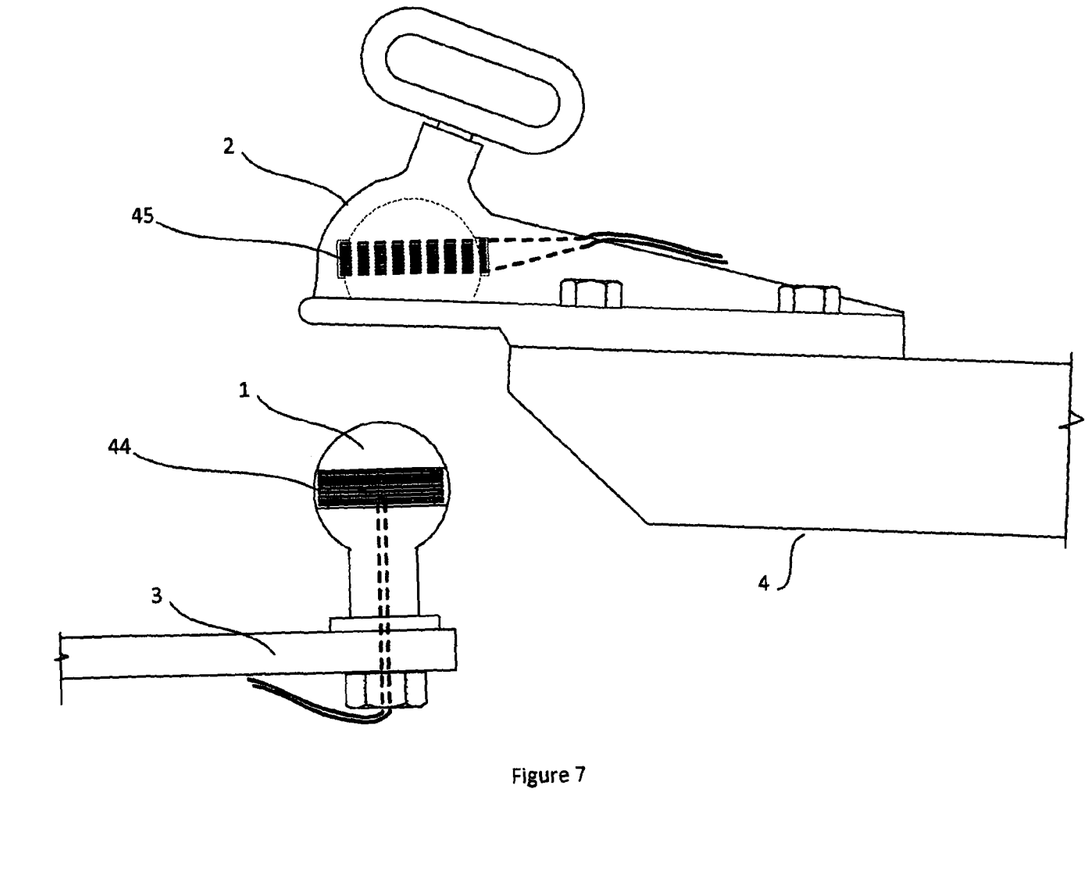
FIG. 7 is a sectional view of a typical tow cup and ball showing copper windings installed in a groove on the outside of the tow ball and a groove on the inside of the tow cup.

An automatic jack/jockey wheel system is included which allows the trailer tow cup to be lowered on to the tow ball by remote control, e.g. blue tooth signal, from the car and allows the jack/wheel to be moved to its stowed (for travelling) position without manual intervention. Electrical connection between the car and trailer is effected by using the tow ball/cup connection as one path and the safety cable as the second path. This allows a DC power current to flow to/from the trailer. Alternatively, the tow ball may be constructed in two parts with electrical isolation between the upper two-thirds and the lower one-third. The suitably isolated tow cup underjaw 28 in contact with the lower third of the tow ball can then form one of the two electrical paths to the trailer and the tow cup in contact with the upper two-thirds of the tow ball forming the second electrical path. A third arrangement for transmission of power from car to trailer is via a wireless, electrical induction system as shown in FIG. 7. This comprises a primary electrical winding mounted in a groove machined in to the tow ball and a secondary electrical winding mounted in a groove machined in the inside surface of the tow cup. When the cup is lowered over the ball, the electrical windings are in close proximity. An electrical alternating current passed through the primary winding from the car electrical system induces a magnetic field in the tow ball and tow cup. The magnetic circuit is closed around the secondary winding via the tow cup underjaw. The alternating magnetic flux induces an alternating current in the secondary winding which can be rectified to direct current in the trailer electrical control box to power the trailer systems and recharge the trailer battery.

A multiplex signal can be written over the DC current to divert the DC to the desired function of tail lights, brake lights, indicators etc. Alternatively, a wireless control signal can be transmitted from the car to the trailer control module.

Additionally, a system is included to automatically release the trailer park brakes at the end of the hitching cycle and to automatically apply the trailer park brakes before the unhitching cycle commences.

BRIEF DESCRIPTION OF THE DRAWINGS

In order that the invention may be well understood, there will now be described some embodiments thereof, given by way of example, reference being made to the accompanying drawings, in which.

DETAILED DESCRIPTION OF THE PREFERRED EMBODIMENTS

With reference to FIGS. 1 to 6 of the drawings, there is shown a system for autonomous and automatic coupling and decoupling of a car and trailer.

Figure 2:
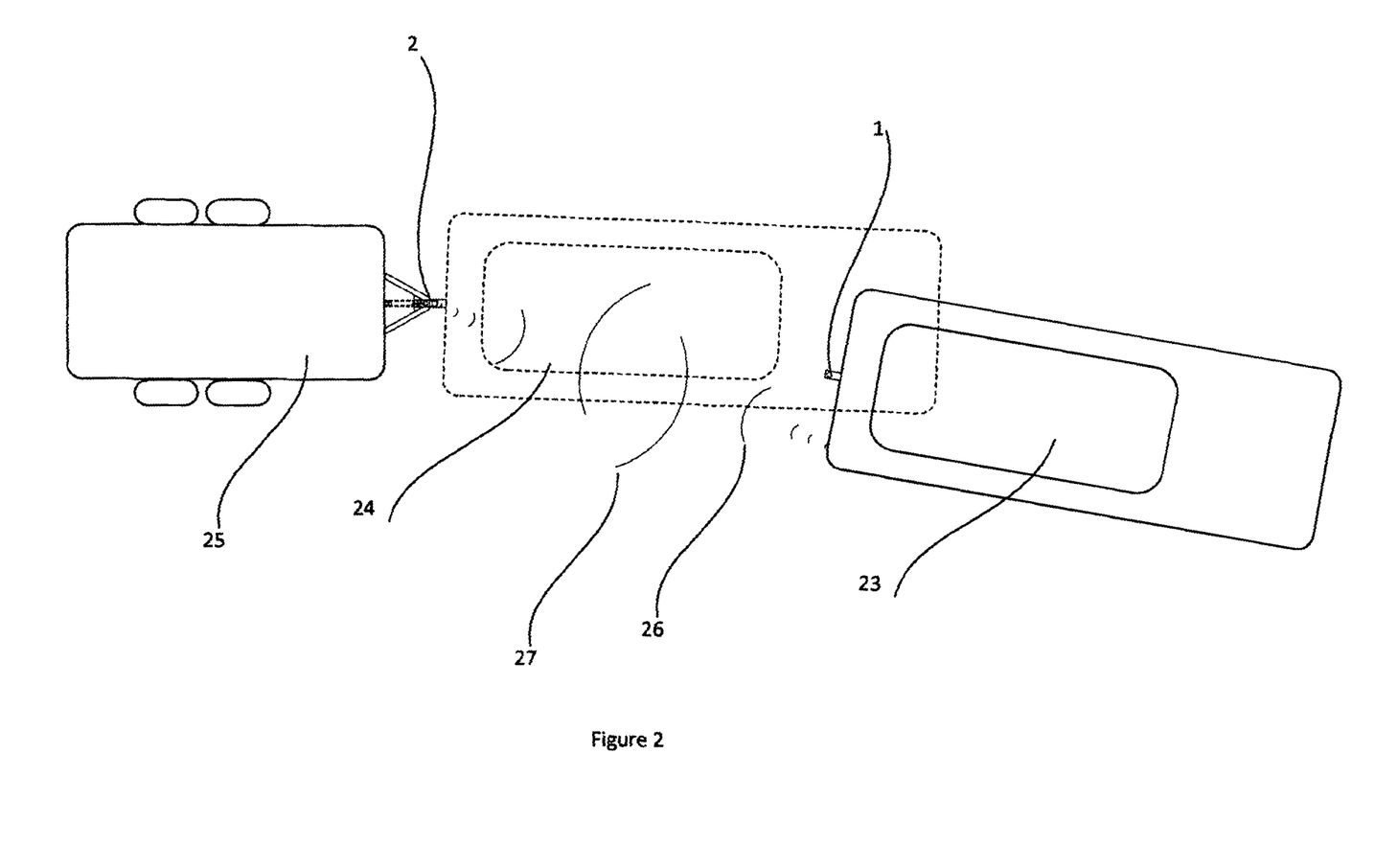
FIG. 2 is a plan view of a towing car and trailer showing a typical attachment manoeuvre utilising the system of the present invention.

Referring first to FIG. 2, there is shown a car 23 having a tow ball 1 fitted centrally to the rear thereof to which is releasable engageable a tow cup 2 mounted on a trailer 25 in order to secure the trailer 25 to the car 23 for towing purposes. The car 23 is fitted with a plurality of signal transceivers, such as ultrasonic or microwave transceivers, which are located in the rear bodywork and rear bumper bar of the car 23 and oriented to transmit signals from the rear and rear flanks of the car 23 in order to detect the location of the trailer 25 and more particularly the tow cup 2 mounted thereon. The signal transceivers are fitted in fixed positions and orientation relative to the tow ball 1 and are connected to an onboard computer in the vehicle such that the computer is able to use the data from the transceivers to locate the trailer and the tow cup 2 and to track the position of the tow cup 2 relative to the tow ball 1 fixed to the car 23.

In a well known manner, Signals 26 from the transmitters travel towards the trailer, are reflected and travel back 27 to the receivers. Only one transmission and reflection is shown in FIG. 2 for clarity, but it will understood that in practice, a multiplicity of transceivers will be fitted which will produce an array of signals towards and around the trailer 25. In particular, one of the transceivers may be located central of the rear of the car in line with and above and/or below the tow ball 1 for allowing accurate locating of the tow eye over the tow ball as they two get close together.

Figure 9:
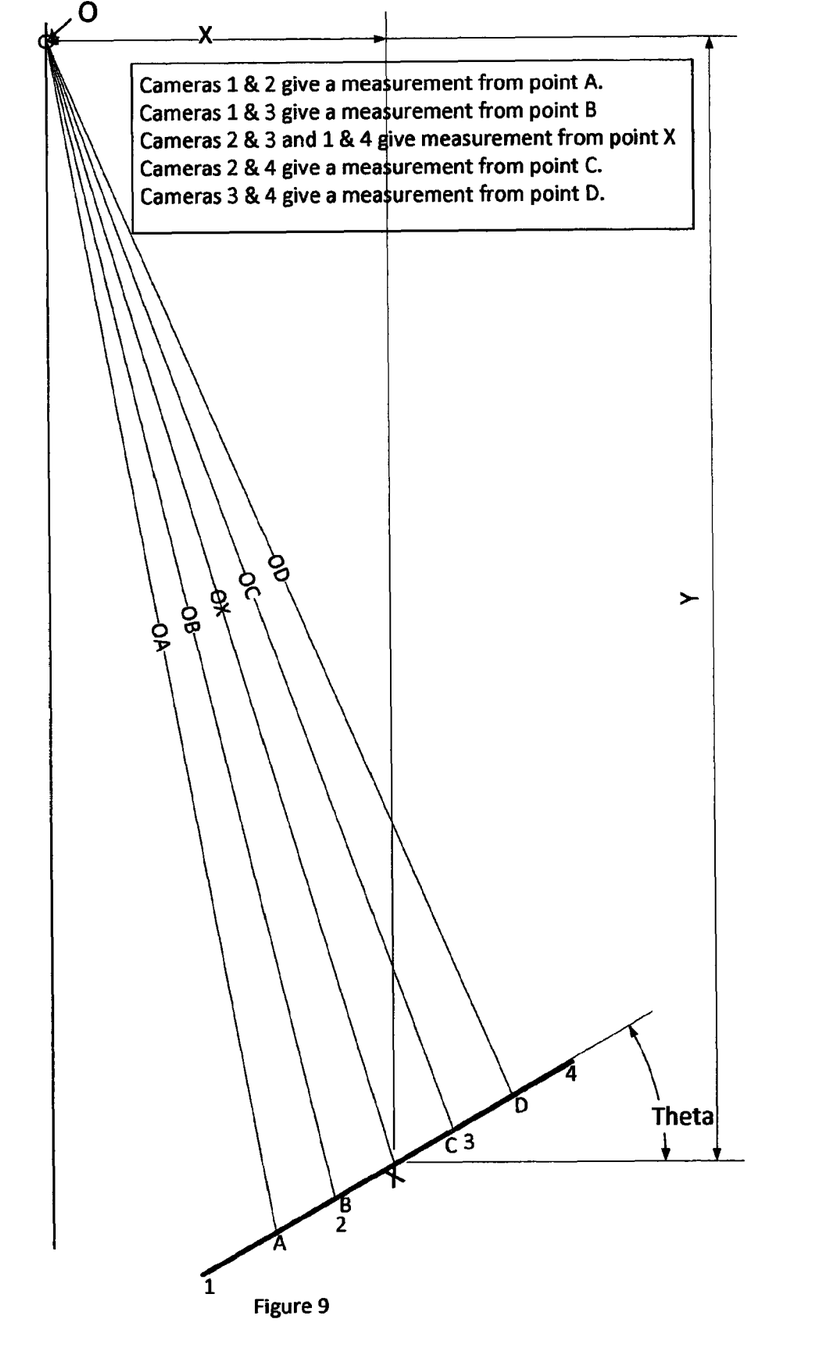
FIG. 9 is a plan view of 4 cameras mounted across the rear of the car giving 5 independent stereo-photogrametric measurements to the tow cup O.

In a preferred embodiment, a camera is also provided, which may be a dedicated camera or a multi-function camera, such as also providing general reversing camera functions, which monitors the area behind the car 23 and is processed by pattern recognition software in the car to help identify the tow cup 2. Multiple cameras, for example, digital cameras mounted in the rear of the car but without dashboard displays will then use photogrammetry to calculate the relative positions of the trailer tow cup and car tow ball. FIG. 9 is a plan view of 4 cameras mounted across the rear of the car giving 5 independent stereo-photogrammetric measurements to the tow cup O.

The onboard computer is also connected to drive and braking systems of the car 23 in a manner known in the art in conjunction with self parking and self driving vehicle systems such that the computer is able to move and steer the car autonomously in order to accurately position the tow ball 1 underneath the tow cup 2 for attachment purposes. Accordingly, once the car has been driven, under driver control, to within a detection distance from the trailer 25, the driver will instruct the car to commence the autonomous reversing process, such as by pressing a button or the like. Using information from the transceivers, camera etc, the onboard computer will then control the car's power steering system, transmission system and braking system to autonomously reverse the car until the tow ball is located exactly below the trailer tow cup. For cars with automatic transmission, the car computer will control the transmission in a manner similar to the cruise controls commonly fitted to cars today. For braking, either the car could be fitted with a servo system which applies the brake automatically or a countdown system, verbally from the car speakers or visually in the car reversing camera, could be used. For a manual car, the driver may be required to provide the power under instruction from the onboard computer, inching the car backwards using gears, clutch and brakes under verbal instruction from the car computer, In both automatic and manual transmission cars, the driver would keep his/her hands off the steering wheel and all directional control will be carried out by the car computer. By using target recognition and pattern recognition to recognise a generic tow cup, the autonomous reversing process will work with any trailer, not just the trailer owned by the car driver.

A second part of the system of the invention is an automatic hitch system, which, when the car's autonomous manoeuvring is complete and the car tow ball is exactly below the trailer tow cup, can be automatically controlled by the car 23 to lower the tow cup 2 onto the tow ball 1 to actually connect the trailer 25 to the car 23. Once properly positioned, the driver will be required to initiate the hitching process. A synthesised voice may, for example, ask the driver to confirm that he/she is ready to proceed with the automatic hitching, or it may simply be that the next stage of the process will not commence until some form of affirmative action is taken by the driver. In either event, the car will detect whether or not the trailer is fitted with automatic hitch system and will only allow the driver to initiate the hitching process if the automated system is detected.

As part of the automatic hitch system, the trailer includes a second drive means or jockey wheel motor 18 and a power supply 15 in the form of a trailer battery connected thereto such that the motor can be used to automatically raise and lower the jockey wheel 20 and thereby raise and lower the tow cup 2 towards and away from the tow ball 1. A transceiver is also provided on the trailer and is connected to the jockey wheel motor 18 such that it can communicate with the car and the movement of the jockey wheel can be controlled by the car. Accordingly, upon the driver actuation the automatic hitching process, the car transmits a signal to the trailer which causes the motor 18 to wind up the jockey wheel 20, lowering the tow cup 2 onto the tow ball 1. Typical tow cups 2 known in the art include a locking jaw or an underjaw 28 which is moveable between a locked position in which it extends into the cavity within the tow cup 2 so as to underlie a tow ball 1 engaged in the tow cup and thereby prevent unintentional release of the tow cup from the tow ball, and a release position in which the underjaw is retracted from the cavity in order to allow a tow ball to be engaged into or released from the tow cup. In the system of the present invention, a motor is connected to the underjaw 28 by means of which the underjaw 28 may be automatically moved between the locked and release positions.

Figure 5:
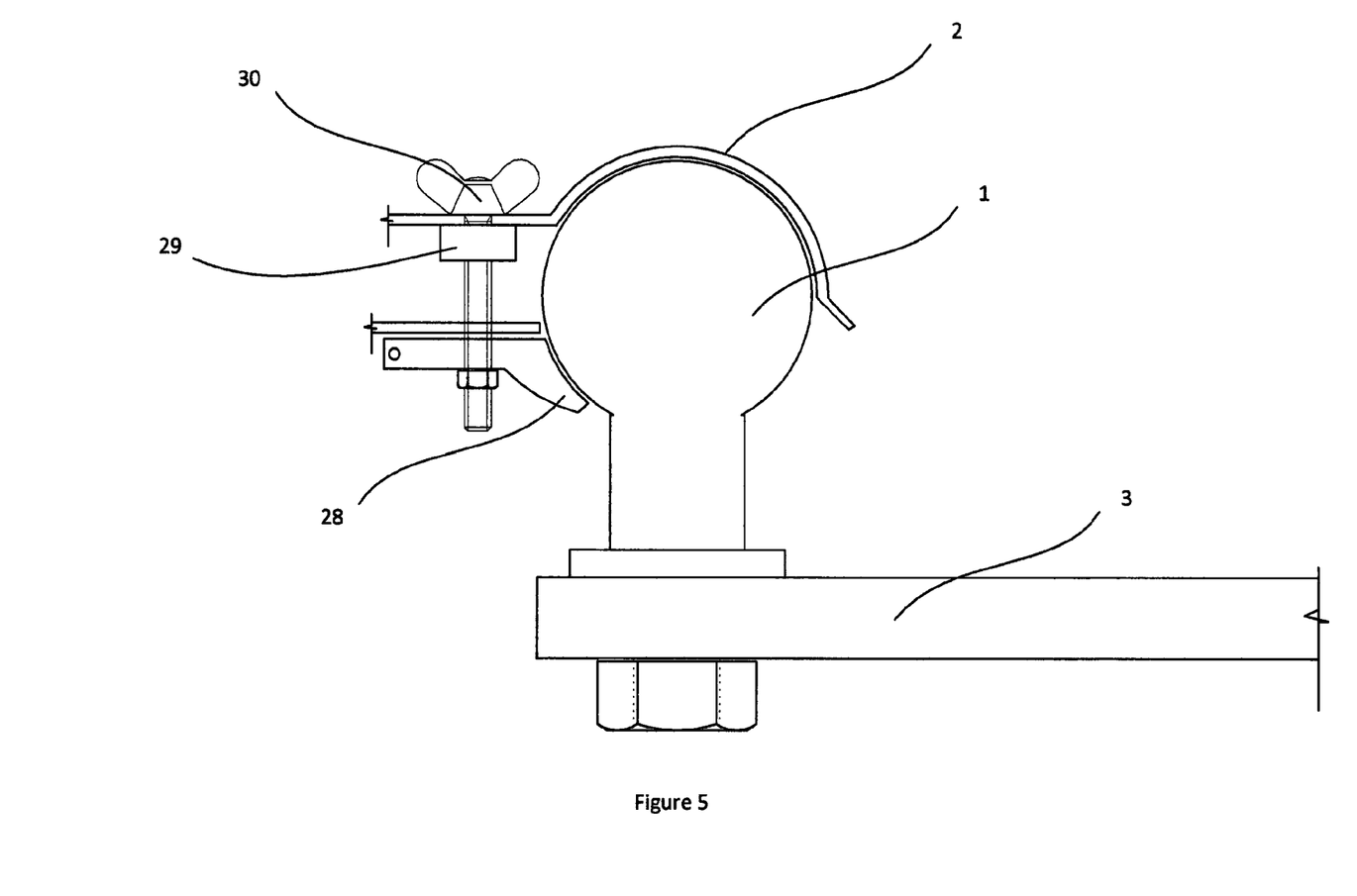
FIG. 5 is a sectional view through the tow ball and tow cup detailing an example of a motor operated tow cup underjaw in accordance with an optional development of the invention.

Accordingly, when the tow cup 2 has landed on the tow ball 1, which may be confirmed by suitable check means such as a simple electrical continuity/resistance check between the trailer tow cup and the tow ball, by proximity switches located appropriately or the like, the control system activates the tow cup motor which, in the preferred embodiment, is connected to an underjaw motorised first drive means 29 driving nut 30, shown in FIG. 5, which operates to pull the underjaw 28 up against the underside of the tow ball 1. Of course it will be understood that other systems may be used for automatically operating the underjaw, such as a solenoid. The motorised drive and nut is preferably configured as a fail-as-is device meaning that in the event of a loss of electrical power, the nut remains in the position in which it was at the instant of power failure. This ensures that the tow cup underjaw 28 cannot be inadvertently opened by loss of power. Of course, a suitable manual override is provided to enable manual release or locking in the event of power loss.

Upon confirmation, the trailer tow cup 2 is accordingly automatically lowered by a transmitted signal from the car activating the jockey wheel motor 18 using power from the trailer battery 15.

Figure 3:
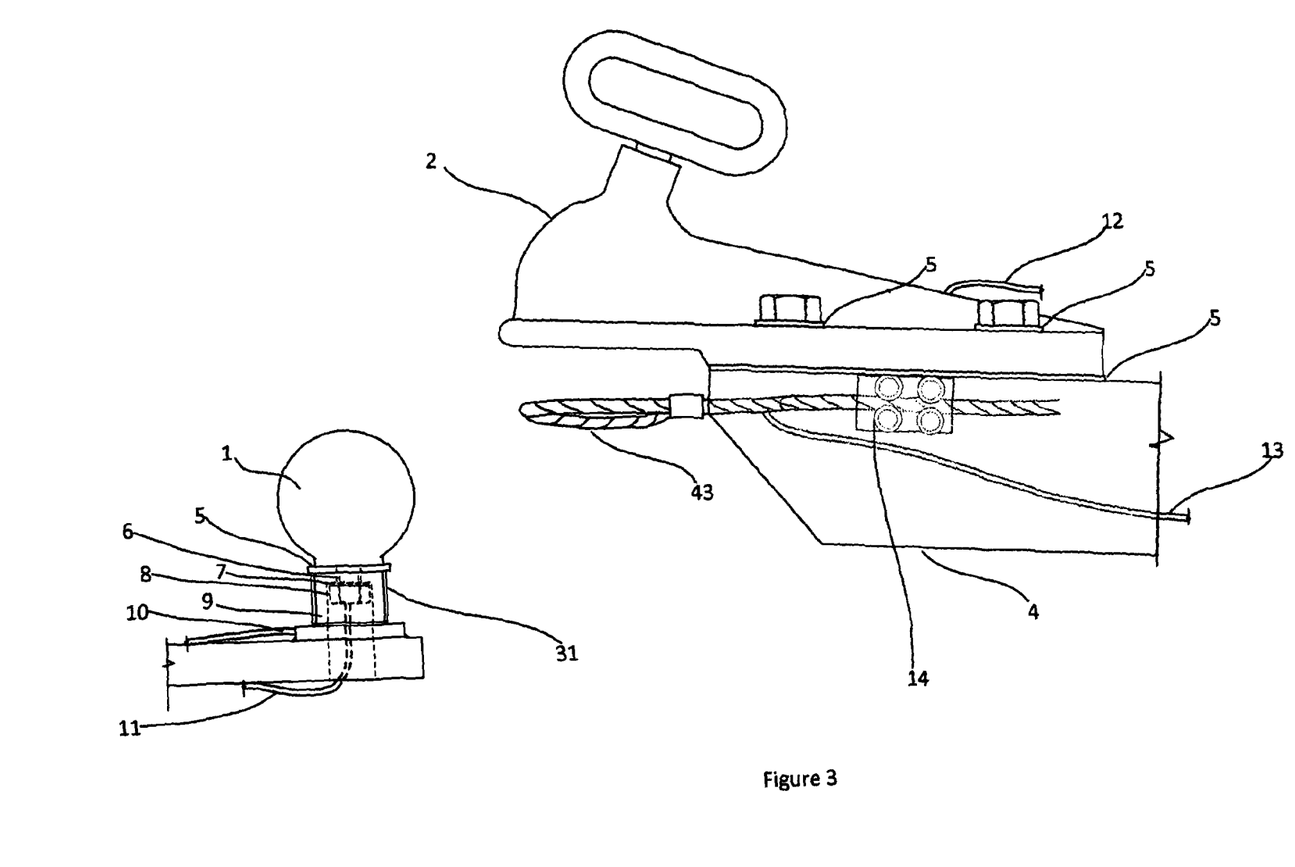
FIG. 3 is a side elevation view of the tow ball and tow cup according to an embodiment of the present invention.

Trailers typically include a safety cable which is looped around a secure part of the vehicle and is connected to a brake on the trailer such that should the trailer inadvertently separate from the car whilst in motion, for example due to mechanical failure or failure of the underjaw, the trailer brake is automatically applied so as to bring the trailer to a stop. In the system of the present invention, a safety cable loop or tether loop 43 is provided, as shown in FIG. 3, which extends from the trailer underneath the tow cup. In particular, the safety cable loop 43 is located such that during the lowering process the tow ball 1 passes through the safety cable loop 43 as it moves towards the tow cup and the loop 43 locates around the neck of the tow ball 1 when the tow ball 1 is fully engaged in the tow cup 1. The safety cable 43 is preferably made of steel wire rope sufficiently stiff to maintain a loop projecting out from the trailer frame 4.

When the underjaw is closed, the control system activates a safety cable traction motor 14 which pulls the safety cable 43 tightly against a rotating sleeve 31 provided around the neck of the tow ball which forms a support post 9 of the tow ball 1. The action of pulling the safety cable tightly against the tow ball support ensures that the safety cable cannot jump off the tow ball in the event that the tow cup 2 breaks free and it also ensures electrical conductivity between the tow ball support post 9 and the safety cable 43. The rotating sleeve 31 is internally lined with a suitable low friction surface such as self-lubricating bronze to ensure that the rotation is between the sleeve 31 and the tow ball support post 9 and not between the sleeve 31 and the safety cable 43. This eliminates wear on the safety cable 43. As the safety cable is connected with the same centre of rotation as the tow ball and tow cup, it does not require much flexibility to accommodate changes as the car corners. Some flexibility is required to accommodate movement in the vertical plane as the car and trailer traverse bumps and hills. This limited flexibility is consistent with adequate stiffness such that the safety cable loop is self-supporting below the tow cup during hitching and unhitching.

The tow ball support post 9 and the tow ball 1 are electrically isolated from each other by insulating washer 5, insulating sleeve 6 and insulating washer 7. An insulated electrical cable 11 is in electrical connection with the tow ball, in particular connects to the bottom of the tow ball 1 and runs from the tow ball 1, inside the hollow tow ball support post 9 to the car electrical system so as to be isolated from the tow ball support post 9. A second insulated electrical cable 10 is electrically connected to the base of the hollow tow ball support post 9 and also runs to the car electrical system.

On the trailer side, the trailer tow cup assembly is electrically insulated from the trailer frame 4 by insulating washers 5 and insulating sleeves on the bolts (not shown). An insulated electrical cable 12 is electrically connected to the tow cup assembly at one end and to the trailer electrical system at the other. Another insulated electrical cable 13 is electrically connected to the safety cable 43 at one end and to the trailer electrical system at the other. A two path, positive and negative electrical circuit is thereby established between the car and trailer electrical system. It will, of course, be understood that the negative circuit may be an earth circuit, so that as long as the trailer has a proper earth on it, the invention may be implemented with just a single path electrical connection between the tow ball 1 and the trailer. In either event, it will be understood that the electrical configuration described above enables power automatically to be delivered from the car to the trailer when the tow cup has been fully lowered onto the tow ball and the loop tightened around the post 9.

Figure 8:
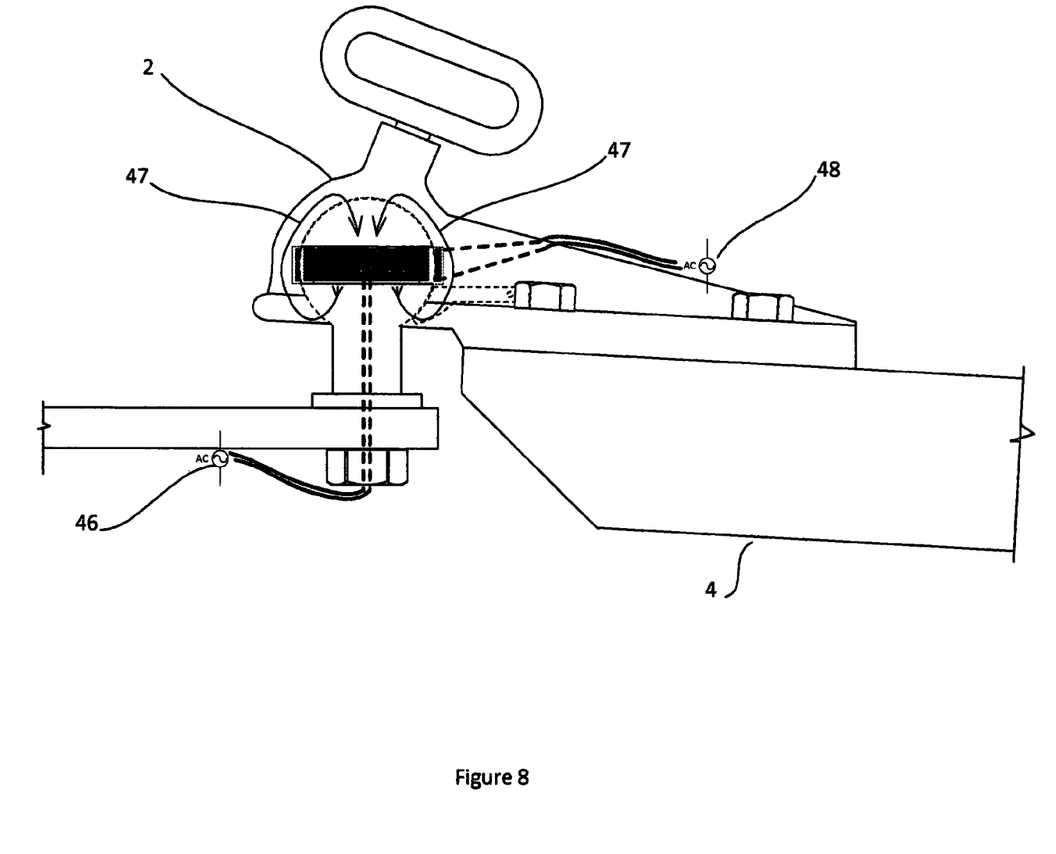
FIG. 8 is a sectional view of the tow cup and tow ball with copper windings brought together to create a magnetic field around the coils.

The wireless power transmission method is shown in FIGS. 7 and 8. A primary electrical winding 44 is installed in a groove machined in the tow ball 1. The feed cables for the primary winding are brought out via the hollow post of the tow ball for connection to the car electrical system. A secondary electrical winding 45 is installed in a groove machined in the inside of the tow cup. The windings will be encased in a hard, dielectric material such as epoxy resin to eliminate ingress of dirt, rust etc and prevent wear of the electrical insulation. When the tow cup is lowered over the tow ball the two electrical windings are in close proximity. An alternating current 46 supplied from the car electrics induces a magnetic field 47 in the tow ball and the surrounding tow cup 2. This magnetic field induces an alternating current 48 in the secondary winding 45. The secondary alternating current is fed to the trailer controller or trailer control box 15, converted to direct current and used to power the trailer functions and recharge the trailer battery.

When the tow cup is lowered over the tow ball the two electrical windings are in close proximity. An alternating current 46 supplied from the car electrics induces a magnetic field 47 in the tow ball and the surrounding tow cup 2. This magnetic field induces an alternating current 48 in the secondary winding 45. The secondary alternating current is fed to the trailer control box 15, converted to direct current and used to power the trailer functions and recharge the trailer battery.

When the electrical pair is made, the car then can provide power for all the trailer functions such as lights, brake lights, and indicators. The power will also recharge the trailer battery. A solar panel can also be provided to trickle charge the battery during extended periods of non-use. Control of the current to all the various trailer functions can be controlled either by a multiplex signal written over the top of the power supply or by wireless signal transmission from the car to a trailer electrical control module 15, the power supply from the car being used to power the control module 15. After confirmation that the tow cup and tow ball are connected, the jockey wheel motor 18 is re-activated until the jockey wheel is the stowed position 21.

Figure 4:
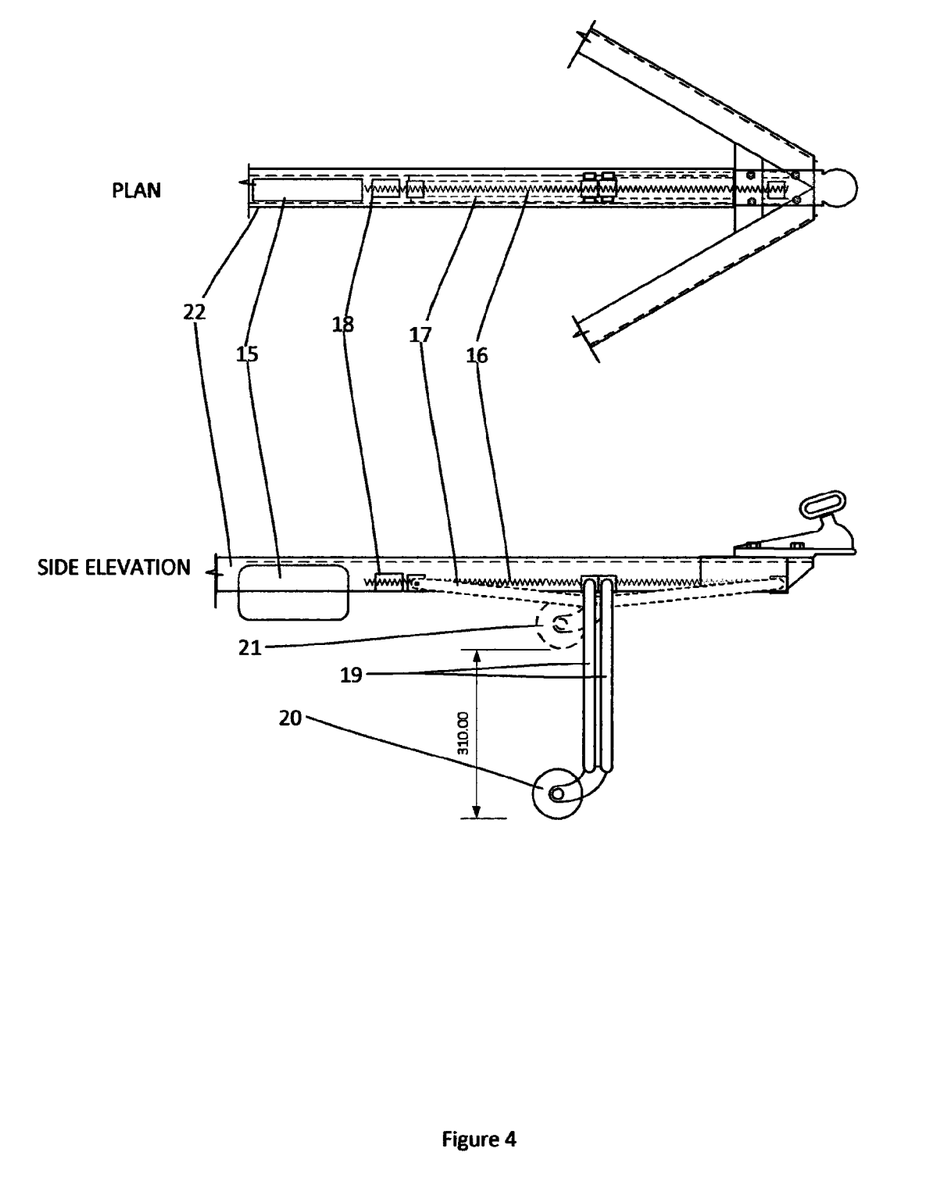
FIG. 4 is a plan and side elevation of the tow bar structure of a trailer showing a motorised jacking arrangement in accordance with one embodiment of the present invention.

Preferably, jockey wheel actuation system is configured as a fail-as-is device meaning that in the event of a loss of electrical power, the nut remains in the position in which it was at the instant of power failure. This ensures that the jockey wheel cannot be inadvertently raised or lowered by loss of power. The jacking arrangement shown in FIG. 4 is a pantograph device intended to minimise the space required above the towbar frame. The jockey wheel could alternatively be raised and lowered via vertical motorised lead screw of sufficient robustness. This arrangement is more compact in the horizontal plane but requires more height above the trailer tow bar. This disadvantage can be mitigated by use of multi-stage (double lift) type of screw jack.

Figure 6:
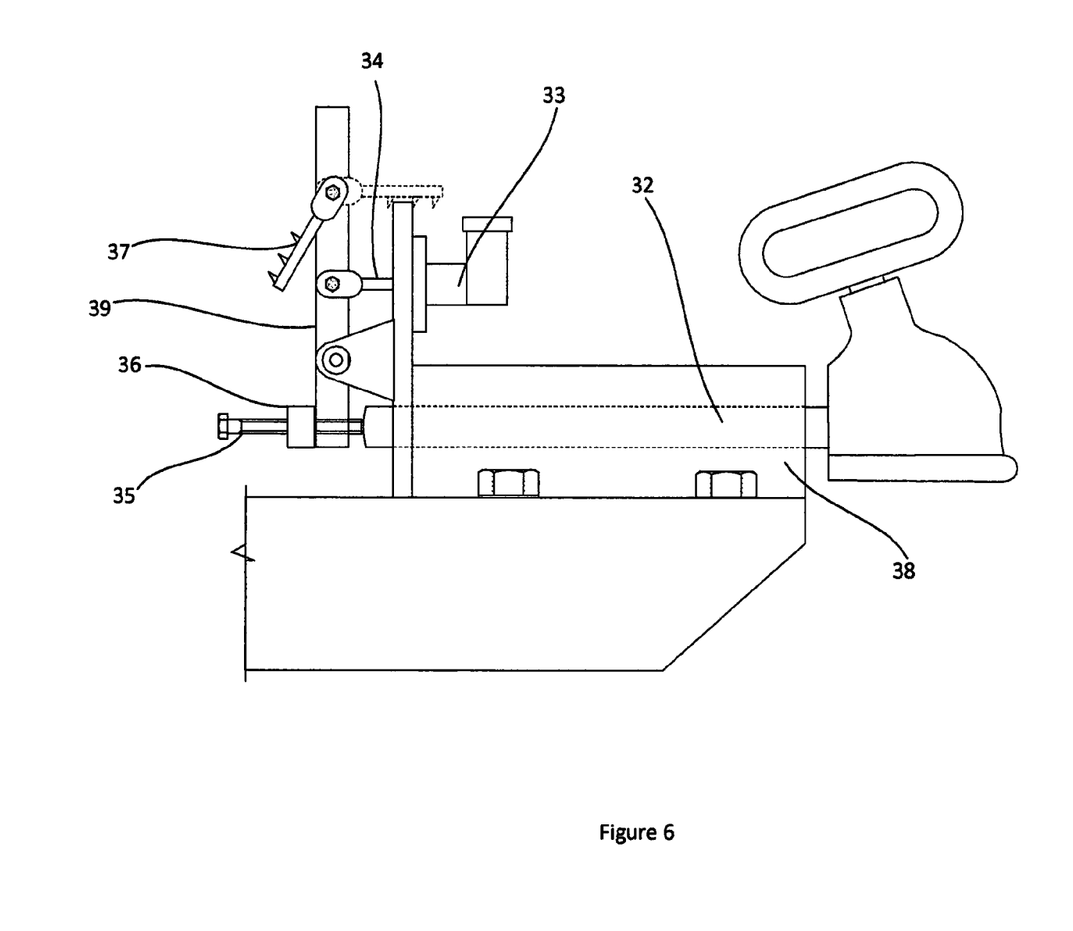
FIG. 6 is a side view of a typical hydraulic trailer brake with a motorised lead screw attached to allow automatic application and release of the trailer brakes.

When the jockey wheel has been stowed, the trailer brakes are automatically released. FIG. 6 shows a typical hydraulic trailer brake mechanism. When the tow car brakes are applied, the trailer momentum forces the trailer hitch body 38 to slide forward along the over-ride shaft 32 which pushes against the adjusting screw 35 which, via the brake lever 39, pushes the hydraulic piston 34 in to the hydraulic cylinder 33 thereby providing pressurised brake fluid to the brakes. In the preferred embodiment, a motorised nut 36 is added to the system. To automatically apply the parking brake, the motorised nut 36 is activated which forces the adjusting screw 35 against the over-ride shaft 32, thereby applying hydraulic pressure to the brakes. The motorised nut 36 is preferably configured a fail-as-is device meaning that in the event of a loss of electrical power, the nut remains in the position in which it was at the instant of power failure.

Trailer unhitching is a reversal of this process carried out automatically by the car and trailer control systems upon activation of the process by the driver.

A lock-out system is provided in the car computer to ensure that the unhitching sequence cannot be initiated while the car is in motion.

It will be understood that while the invention has been described in connection with particular actuating systems such as motorised nuts, and particular connection systems, other known arrangements for achieving the same result are also possible within the scope of the invention, such as servo motors, solenoids and the like. It is the function performed by the specified features which is the important part of the invention.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiment.

What is claimed is:

1. An automated system for hitching the tow cup of a trailer to a tow ball comprising:
    a trailer having a tow cup with a tow ball cavity formed therein;
    a locking jaw associated with the tow ball cavity and moveable between a release position in which it is substantially withdrawn from the tow ball cavity so as to allow, in use, a tow ball to be inserted into or withdraw from the cavity, and a locked position in which it is extended into or under the cavity so as, in use, to lock a tow ball in the cavity;
    first drive means operable to move the locking jaw between the locked and release positions;
    a jockey wheel located proximate the tow cup and vertically moveable to raise and lower the tow cup relative to the ground;
    second drive means connected to the jockey wheel for vertically moving the jockey wheel;
    a trailer controller connected to the first and second drive means for controlling the movement of each of the jockey wheel and the locking jaw;
    a power supply for supplying power to the controller and each of the first and second drive means; and
    wherein the trailer controller wirelessly receiving instructions regarding movement of the jockey wheel and the locking jaw and wirelessly controlling operation of the first and second drive means in order to automatically engage and release the trailer from a tow ball on a vehicle.

2. The automated system according to claim 1, wherein the trailer controller is adapted to wirelessly receive a signal from a vehicle controller for operation of the first and second drive means.

3. The automated system according to claim 1, wherein the first drive means for the locking jaw comprises one of a motorized drive nut, servo motor, or solenoid.

4. The automated system according to claim 1, wherein the jockey wheel and the locking jaw are each locked in their current position in the event of failure of the associated drive means.

5. The automated system according to claim 1, wherein the locking jaw is biased into its locked position.

6. The automated system according to claim 1, wherein the trailer includes brakes which are automatically released when the trailer has been attached to a vehicle.

7. The automated system according to claim 1, wherein a tether cable is provided on the trailer having a loop which is located below the tow cup such that the loop will automatically locate over a tow ball which is being inserted into the tow cup.

8. The automated system according to claim 7, wherein the tether is retractable so as to enable it, in use, to be tightened around the neck of a tow ball to which the tow cup has been engaged.

9. The automated system according to claim 7, wherein the tether cable is connected to a power supply means of the trailer and is configured to make an electrical connection with a part of the tow ball around which, in use, it is tightened so as to act as part of a system to supply power to the trailer from the vehicle to which it is attached.

10. An automated system for hitching the tow cup of a trailer to a tow ball comprising:
    a trailer having: a tow cup with a tow ball cavity formed therein; a locking jaw associated with the tow ball cavity and moveable between a release position in which it is substantially withdrawn from the tow ball cavity so as to allow, in use, a tow ball to be inserted into or withdraw from the cavity, and a locked position in which it is extended into or under the cavity so as, in use, to lock a tow ball in the cavity; first drive means operable to move the locking jaw between the locked and release positions; a jockey wheel located proximate the tow cup and vertically moveable to raise and lower the tow cup relative to the ground; second drive means connected to the jockey wheel for vertically moving the jockey wheel; a trailer controller connected to the first and second drive means for controlling the movement of each of the jockey wheel and the locking jaw; a power supply for supplying power to the trailer controller and each of the first and second drive means; and wherein the trailer controller wirelessly receiving instructions regarding movement of the jockey wheel and the locking jaw; and
    an automated system for aligning a vehicle tow ball with the tow cup of the trailer having: a vehicle having a tow ball mounted on the rear thereof; a vehicle controller for controlling steering and braking of the vehicle, and the automated connection of the tow ball and tow hitch; a plurality of sensors and multiple cameras configured to perform stereo photogrammetry for detecting and identifying an object within a region behind the vehicle and providing data, wherein the sensors and cameras are connected to the vehicle controller which is configured to utilize the data from the sensors and the cameras, in conjunction with a pattern recognition system, to identify, in use, the tow cup of a trailer located within said region behind the vehicle, and to control the movement of the vehicle in order to bring the tow ball into alignment beneath the identified tow cup so as to facilitate coupling and decoupling of the tow cup onto the tow ball; and the vehicle controller wirelessly connectable to the jockey wheel second drive means and locking jaw first drive means for controlling movement of the jockey wheel and the locking jaw of the trailer,
    whereby signals from the vehicle controller are wirelessly receivable for operation of the first and second drive means in order to automatically engage and release the trailer from the tow ball on the vehicle.

* * * * *